Figure 1:
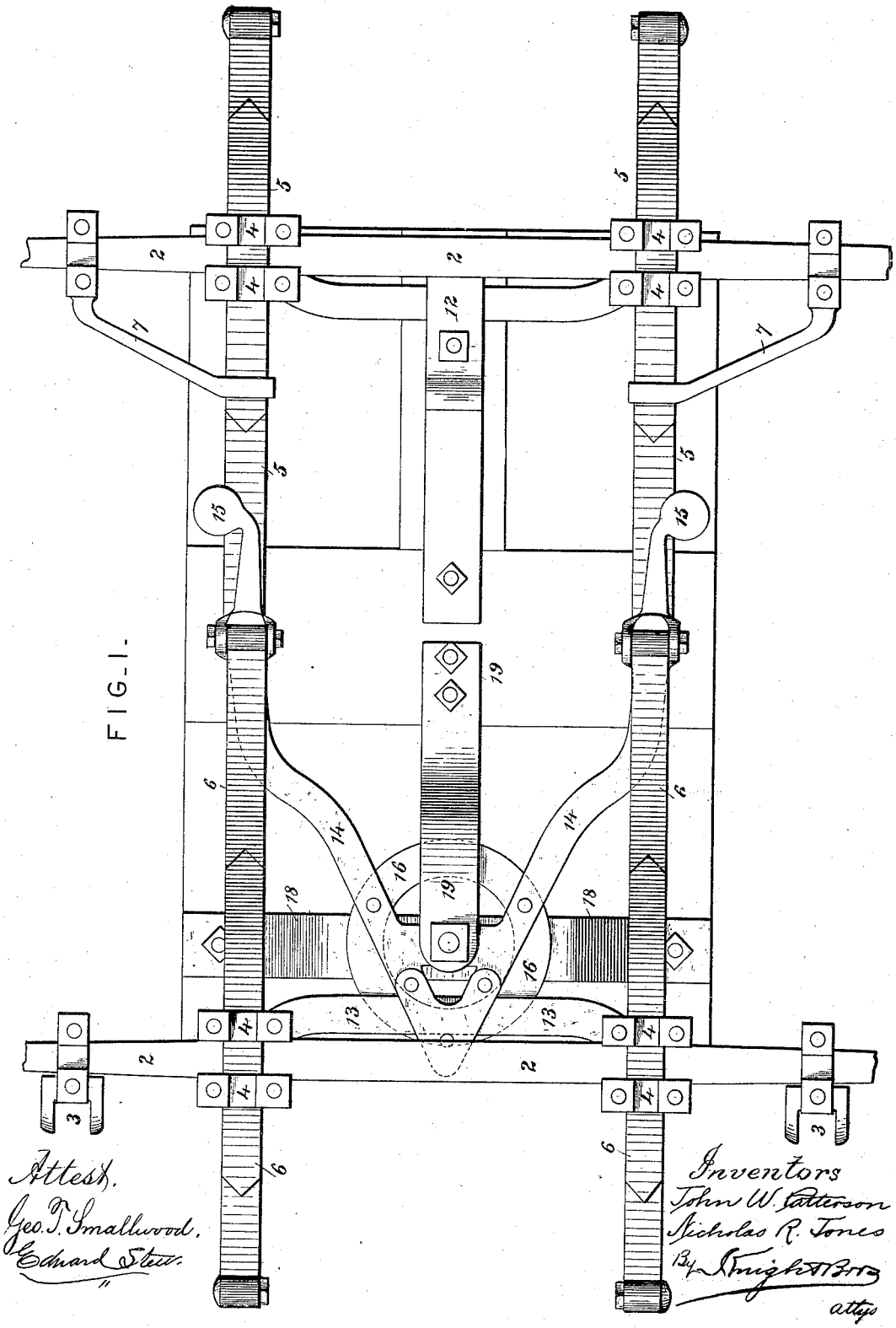

(Model.) 2 Sheets—Sheet 1.

J. W. PATTERSON & N. R. JONES.
VEHICLE.

No. 313,763. Patented Mar. 10, 1885.

Attest.
Geo. T. Smallwood.
Edward Stett.

Inventors
John W. Patterson
Nicholas R. Jones
By Knight Bros
attys

N. PETERS, Photo-Lithographer, Washington, D. C.

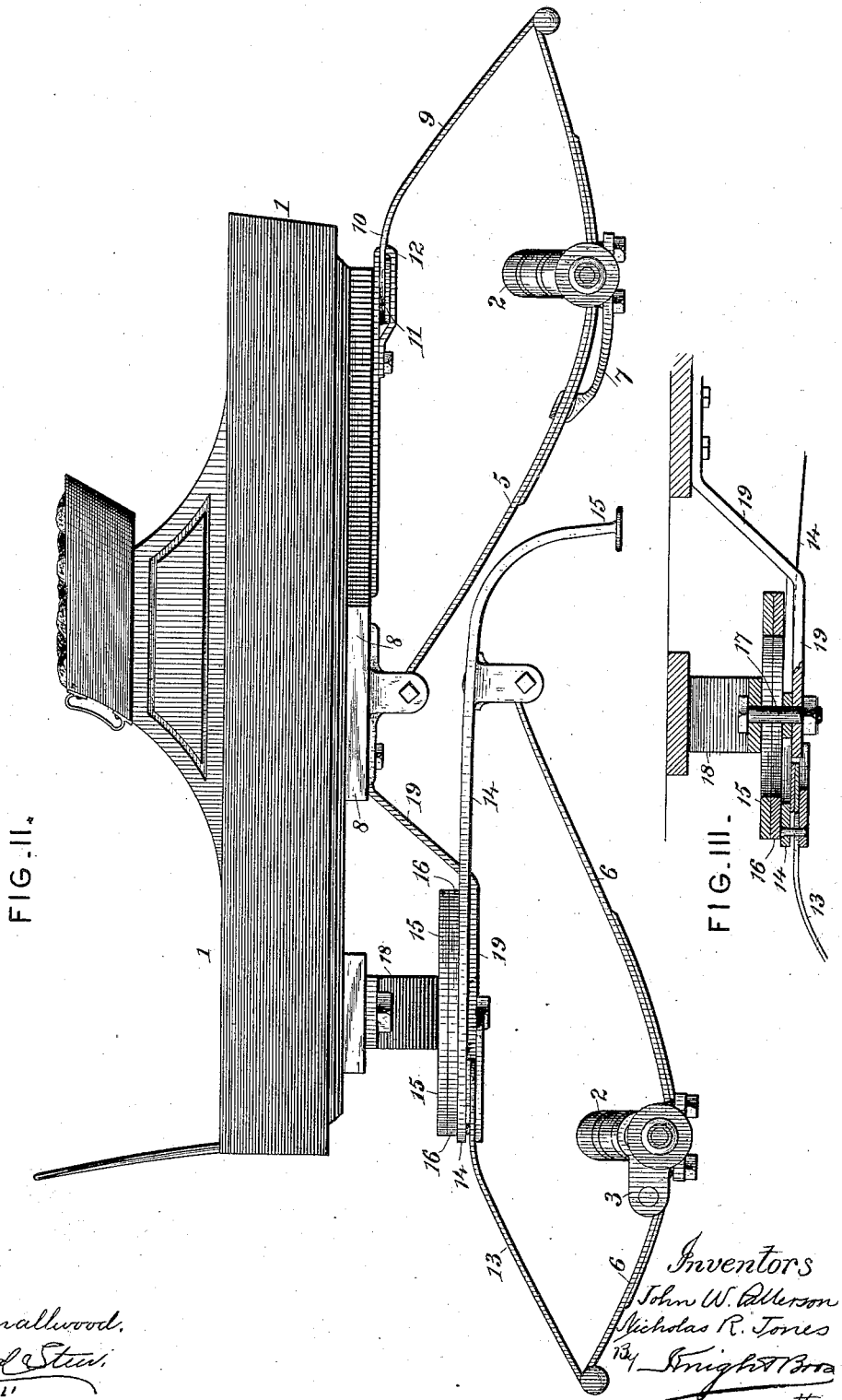

UNITED STATES PATENT OFFICE.

JOHN WILLIAM PATTERSON AND NICHOLAS ROWLAND JONES, OF SLAUGHTERVILLE, KENTUCKY.

VEHICLE.

SPECIFICATION forming part of Letters Patent No. 313,763, dated March 10, 1885.

Application filed October 20, 1884. (Model.)

*To all whom it may concern:*

Be it known that we, JOHN W. PATTERSON and NICHOLAS R. JONES, citizens of the United States, residing at Slaughterville, in the county of Webster and State of Kentucky, have invented certain new and useful Improvements in Vehicles, of which the following is a specification.

The improvements relate to means for supporting the body of the wagon or buggy from the axles through the medium of springs in such a manner that the cost of construction is lessened, the turning of the wagon or buggy in less space is permitted, and the disagreeable end or side motion of the bed upon its springs entirely done away with. To these ends we employ fore and aft half-elliptic springs, which are fastened by clips directly to the axles at bottom, and respectively to the body and fifth-wheel or wear-iron at top. An iron bolster and brace are provided for attachment of the fifth-wheel to the body, and other braces are employed for stiffening the springs from the axles to which they are clipped.

In order that our invention may be more fully understood, we will proceed to describe it with reference to the accompanying drawings, in which—

Figure I is an under side view of our improved vehicle. Fig. II is a side elevation thereof. Fig. III is a vertical longitudinal section of the same.

1 is the bed or body of a wagon or buggy. 2 are the axles, and 3 the couplings on the front axle, of ordinary form, for the attachment of a tongue or shaft. To the under side of the axles are fastened, by clips 4, half-elliptic springs 5 6. The springs 5 are braced from the rear axle by arms 7, and are clipped at their forward ends to the wagon-body or a bolster, 8, thereon. The rear ends of the springs 5 are connected to the rear end of the body by a spring, 9, formed in sections, and whose ends 10 11 are clamped in a strap, 12, fixed to the wagon-body, or to a bolster thereon. A similar spring, 13, is employed for attachment of the forward ends of the springs 6, and is clamped at the center to the A-shaped platform 14, to the rear ends of which are clipped the rear ends of the springs 6. The ends of the platform 14 are extended to form steps 15, one or the other of which is extended beyond the body, according to which way the front axle is turned. The wear-iron or fifth-wheel 15 16 is bolted to the platform 14, which is pivoted by king-bolt 17 to an iron or other bolster, 18, on the forward end of the wagon-body. A bracket, 19, bolted to the wagon-body, or a bolster thereon, braces the lower end of the king-bolt and obviates the necessity of employing a reach or pole.

It will be seen that with such a construction as here shown the front axle is not weakened by having the king-bolt pass through it, and the king-bolt may be placed at such a distance in the rear thereof as to afford a large swing to the axle, thus enabling the wagon or buggy to turn in a much smaller space than a vehicle of ordinary construction. By using fore and aft springs for both the front and rear axles rigidly connected to the platform and body and braced by the transverse portions of the springs 9 13 and the platform 14 both end and side motion of the body are entirely done away with.

Having thus described our invention, the following is what we claim as new therein, and desire to secure by Letters Patent:

1. In combination with the body 1, the braces 18 19, and the upper wear-iron, 15, supported thereon, the half-elliptic springs 6, clipped to the front axle, the springs 13, having the overlapping transverse portions, the platform 14, to which the springs 6 and 13 are attached, and the lower wear-irons, 16, all constructed and arranged substantially as and for the purpose set forth.

2. In combination, the body 1, the transverse brace 18, and the longitudinal brace 19, the wear-irons 15 16, and the platform 14, located between said braces, the king-bolt 17, passed through the whole, as described, and springs supporting said platform, as set forth.

3. In combination with a spring having a transverse portion fixed directly to the wagon-body, as shown, a rear axle and half-elliptic springs connected at their rear ends to the upper spring and at their forwards ends to the wagon-body.

4. In combination with the fore and aft springs fixed to the axle, side rods also fixed to said axle at one end and to the said springs at the other for bracing the same, substantially as set forth.

5. The front axle, 2, the half-elliptic springs 6, secured thereto, and the quarter-elliptic springs 13, secured at their forward extremities to the springs 6, and having the horizontal transverse portions, as described, in combination with the platform 14, of A form, having the transverse portions of the springs 13 secured to its united end and the rear extremities of the springs 6 secured to its divergent arms, and the wear-irons 15 16, substantially as set forth.

6. In a spring-wagon, a platform of A form having the rear extremities of the upper quarter-elliptic members of the front springs connected with its united ends and the rear extremities of the lower half-elliptic members of said springs secured to its divergent arms, in combination with said springs of three-quarter-elliptic form and the wear-irons supported thereby, as explained.

7. The combination, with the bottom half-elliptic member of a spring, of the upper quarter-elliptic member secured to said bottom member at one end and having at the other a rigid horizontal transverse arm secured to the bottom or platform of the wagon, as set forth.

8. In a platform spring-wagon, the combination, with the platform, the lower wear-iron supported thereby, and the upper wear-iron secured to the body of the wagon, or a bolster secured thereto, of a king-bolt passing through said wear-irons and platform, and a brace extending from the floor of the wagon and embracing said king-bolt below the platform, substantially as set forth.

JOHN WILLIAM PATTERSON.
NICHOLAS ROWLAND JONES.

Witnesses:
H. H. WHITSON,
W. R. PARKER.